(12) United States Patent
Ho

(10) Patent No.: US 11,927,763 B1
(45) Date of Patent: Mar. 12, 2024

(54) HEADSETS FOR MOBILE DEVICE

(71) Applicant: Conrad Ho, San Jose, CA (US)

(72) Inventor: Conrad Ho, San Jose, CA (US)

( * ) Notice: Subject to any disclaimer, the term of this patent is extended or adjusted under 35 U.S.C. 154(b) by 0 days.

(21) Appl. No.: 17/933,080

(22) Filed: Sep. 16, 2022

(51) Int. Cl.
*G02B 27/01* (2006.01)
*H04M 1/72409* (2021.01)

(52) U.S. Cl.
CPC .. *G02B 27/0176* (2013.01); *H04M 1/724097* (2022.02)

(58) Field of Classification Search
CPC .............. G02B 27/0176; H04M 1/724097
See application file for complete search history.

(56) References Cited

U.S. PATENT DOCUMENTS

| | | | |
|---|---|---|---|
| 2016/0195723 A1* | 7/2016 | Murray | G02B 27/0172 359/631 |
| 2017/0253175 A1* | 9/2017 | Zhang | B60Q 1/44 |
| 2018/0014597 A1* | 1/2018 | Cooke | A42B 3/042 |
| 2018/0106635 A1* | 4/2018 | Mu | G01C 21/3652 |
| 2018/0235302 A1* | 8/2018 | Weigen | A42B 3/044 |
| 2019/0086676 A1* | 3/2019 | Reed | G02B 27/0176 |

* cited by examiner

*Primary Examiner* — Sahlu Okebato
(74) *Attorney, Agent, or Firm* — Miller IP Law; Devin Miller

(57) ABSTRACT

Described herein are examples of a headset for mobile devices comprising a visor frame with a housing, a display screen, a mobile device connector, and a mobile device wherein the housing secures the mobile device adjacent to the display screen. The headset further includes a rear assembly with a microcontroller and a microcontroller connector. The display screen is configured to reflect an image from the screen of the mobile device, and the headset additionally includes lighting devices, and an application configured to receive input signals and send output commands to the headset to provide safety features for the headset for mobile devices.

20 Claims, 13 Drawing Sheets

HEADSETS FOR MOBILE DEVICE

CROSS-REFERENCE TO RELATED APPLICATIONS

The present application claims the benefit of U.S. Provisional Patent Application No. 63/246,142 entitled "HEADSET WITH HEADS-UP DISPLAY PROVIDING SAFETY AND SIGNAL ILLUMINATION", filed on Sep. 20, 2021. The entire contents of the above-listed application are hereby incorporated by reference for all purposes.

BACKGROUND

Protective head gear has been in use since at least the time of the Roman centurions. The recognition of head trauma as a major cause of death to soldiers eventually led to the mandatory use of hard protective helmets for all infantry. Protective head gear eventually made its way to civilian use for dangerous activities, such as motorcycle riding, football, mountain climbing and downhill skiing.

In recent decades helmets have become mandatory in most U.S. states for motorcyclists, and even youth bicyclists. The resulting improved outcomes for victims of head trauma has saved countless lives. From the first leather padded football helmets to today's carbon fiber space age motorcycle helmets, there have been countless improvements in the lightness and protective quality of modern helmet.

Smart helmets with added safety features have recently be introduced, however many of the new smart helmets simply provide safety lights and audio capabilities for phone or music use.

BRIEF DESCRIPTION OF THE DRAWINGS

The present description will be understood more fully when viewed in conjunction with the accompanying drawings of various examples of a headset for a mobile device. The description is not meant to limit the headset for a mobile device to the specific examples. Rather, the specific examples depicted and described are provided for explanation and understanding of the headset for a mobile device. Throughout the description the drawings may be referred to as drawings, figures, and/or FIGS.

DETAILED DESCRIPTION

Figure 1A:
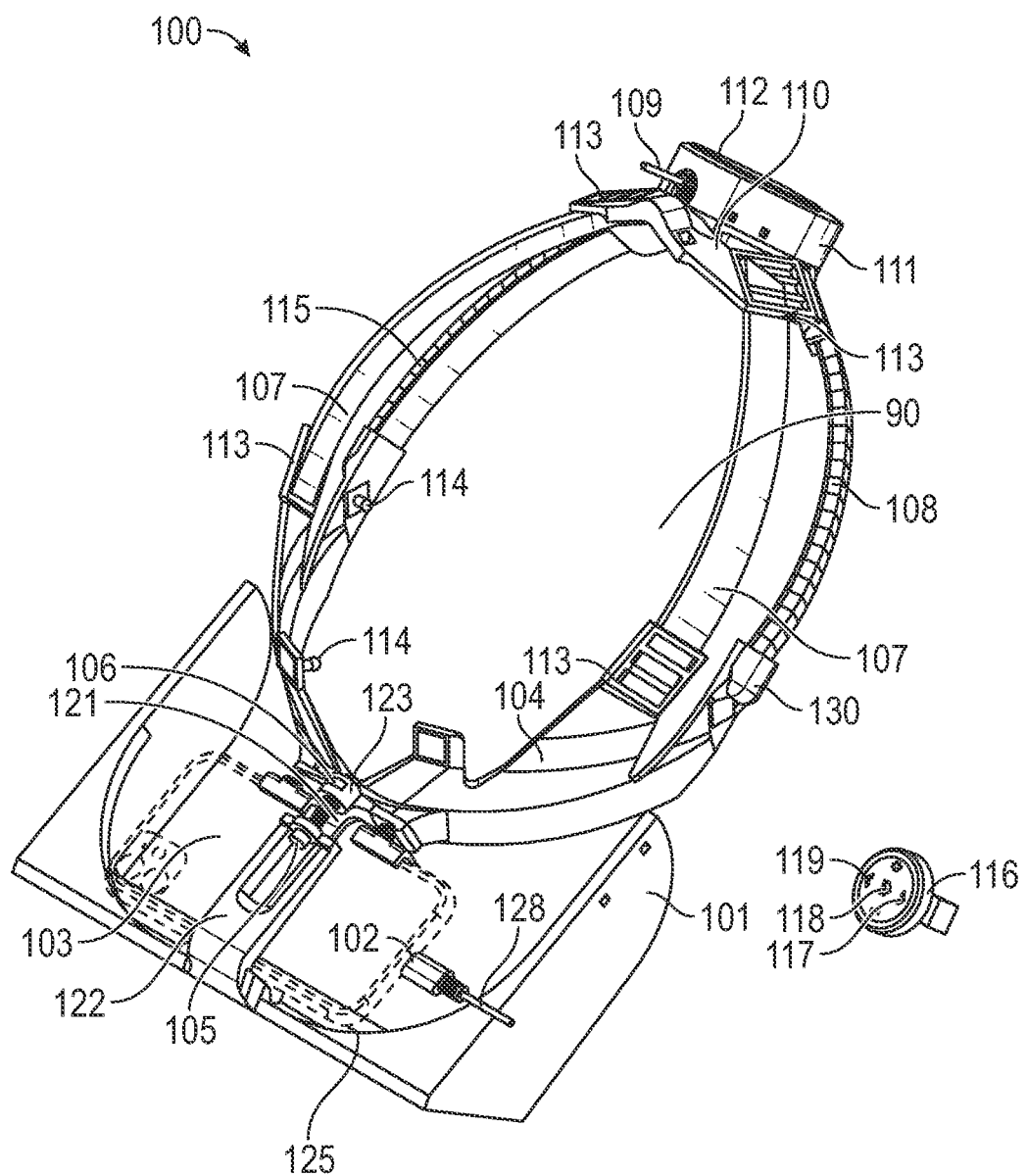
FIG. 1A is a perspective view of a headset for a mobile device with a wireless controller.

A headset for a mobile device as disclosed herein will become better understood through a review of the following detailed description in conjunction with the figures. The detailed description and figures provide merely examples of the various embodiments of headset for a mobile device. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

The use of safety helmets for recreational sports, exercise, transportation, and/or leisure has greatly increased over the preceding decades. Not long ago, motorcycle riders, recreational bicyclists, and skiers went helmetless on almost all occasions. The increase in attention to head trauma, and particularly concussions, has increased the awareness of personal safety. Most importantly, the increase in safety provided by protective helmets has saved countless lives over the ensuing decades. However, while helmet awareness and use has greatly improved, the features and abilities of modern safety helmet has remained stagnant.

Conventional safety helmets include a rigid outer shell surrounding a soft inner core that comes in direct contact with the head. The rigid outer shell can be prepared from different lightweight and energy absorbing materials. Safety helmets accomplish the task of distributing impact force to shield the user for the worst effects of head trauma. However, modern safety helmets are lacking the technological advances provided by modern mobile technology.

The advances in mobile technology, and the associated applications for mobile technology, allow for increased adaptability, safety features, and intractability to be associated with modern safety helmet. The headset for mobile devices can provide information to the user through visual and/or audio means, while simultaneously providing safety information to others in the visual, auditory, or electronic range (e.g., Bluetooth or short range electronic wireless transmissions) of the user.

Embodiments of the headset for mobile devices can be configured to be used for any activity that uses protective head gear, including, but not limited to, motorcycles, bicycles, scooter, unicycles, hoverboards, skateboards, roller skates, skiing, snowboarding, mountain climbing, spelunking, caving, hiking, and/or walking.

Embodiments of the headset for mobile devices provide images projected onto a display visor. Embodiments of the headset for mobile devices can further include lighting devices, such as side facing, front facing, rear facing, and upward facing, that illuminate to alert others of the presence of the user. The lighting devices can also inform others in the environment of the user of actions taken by the user, such as turning, slowing down, or stopping.

The mobile device (also referred to as an ancillary device) including but not limited to, a smartphone, tablet, or computer, is configured to execute applications and can be secured to the headset adjacent to a display visor. Alternate embodiment that do not employ reflecting of the screen of the mobile device onto the display screen can have the mobile device secured in an alternate location on the headset, these embodiments require a display screen capable of rendering an image from data supplied by the mobile device. The application is configured to receive and process input signals and send commands to the microcontroller to control the lighting devices, voice activation commands, and other technological features of the headset for mobile devices. The application can have access to cellular and WIFI available data from the mobile device, access to other applications running on the mobile device, access to geolocation data from a mobile device, access to gyroscopic data from a mobile device; and access to voice recognition and text-to-speech applications on the mobile device. Features and abilities of the mobile device and associated third-party applications can be accessible by the application for the headset for mobile devices. The application for a headset for a mobile device includes features such as, screen controls configured to produce an image on a screen of a mobile device configured to be reflected on a display screen external to the mobile device; access to geolocation data from a mobile device; access to gyroscopic data from a mobile device; a left turn signal task performance; a right turn signal task performance; a direction change task performance; a speed change task performance; voice recognition; and text-to-speech.

Embodiments of the headset for mobile devices use power directly from the mobile device. For example battery power from the mobile device powers the headset for mobile devices, including the lighting devices and microcontroller. Additionally, the mobile device provides the processing and control aspects of the technological features of the headset for mobile devices. Further, the mobile device can be wireless or wired directly to the headset. Bluetooth is a preferred wireless technology for the headset for mobile devices.

The headset for mobile devices utilities the power source from the mobile device and therefore does not require the user to separately charge the headset for mobile devices. The use of the mobile device power source alleviates issues related to battery drain during prolonged storage of the headset for mobile devices (often stored without the mobile device). The battery life of the headset for mobile devices is the battery life of the mobile device, which users generally charge on a daily basis to allow for normal mobile device use.

The control features of the headset for mobile device are received/sent, processed, controlled and executed by an application on the mobile device. Additionally, existing functionalities of the mobile device, that do not raise safety issues, are available to the user. For example, the user can use one application on the mobile device to play music while a separate application controls the safety features of the headset for mobile devices, such as turn signals or safety lights. Applications that rely on voice activated functionalities of the mobile device, including, but not limited to Google Voice, Amazon Alexa, and Apple Siri can be used while wearing the headset for mobile devices.

The headset for mobile devices employs a dedicated application that is run or executed on the mobile device. The application can provide audio or visual feedback based on specific actions taken by the user, the user interactions with the headset for mobile devices, the users interactions with the controller, information provided by the mobile deice, or stimulus/signals from the environment of the user. FIGS. 7-15 are non-limiting examples of flowcharts detailing tasks the application executes for the user.

Embodiments of the headset for mobile devices allow the mobile device to monitor the location and activity data of the user. The ability of the mobile device to monitor the location and activity of the user can improve the sensitivity and accuracy of applications. Privacy concerns for users are always a consideration, and the application can be configured to allow the user to choose privacy setting. However, certain third-party applications require location data and may not be compatible with the application for headsets for mobile devices without location/privacy data.

Embodiments of the headset for mobile devices can further include controllers that communicate with the mobile device. The controller can be secured in a fixed location, such as user's forearm, a user's hand, a user's clothing, or on a mobile transportation device (e.g. a bicycle handle) to allow the user to safely perform control activities. The controller can be activated manually, such as clicking a button or flipping a switch, or voice activated by speaking into a microphone located within the audible range of the user. The controller can be integrated with or separate from the mobile device.

Embodiments of the headset for mobile devices can be configured to use a common mobile device connector, including, but not limited to USB-C devices. The use of a common mobile device connector allows the headset for mobile devices to be used with various types of mobile devices.

FIG. 1A is a perspective view of the headset for mobile devices 100 including a front assembly 104 including a display screen 125, a visor frame 101, a mobile device connector 102, and a mobile device 103. The mobile device 103 and visor frame 101 are affixed to the front assembly 104 by a housing 121 formed by joining a screw 105 affixed to a first housing portion 122 of the visor frame 101 and a nut 6 fixed to a second housing portion 123 of the front assembly 104. FIG. 1A further illustrates a base assembly 110 attached to a rear assembly 111, wherein the rear assembly 111 includes a microcontroller connector 109 and a lighting device 112. The front assembly 104 and base assembly 110 are affixed via straps 107, buckles 113, and pegs 114. Embodiments of the headset for mobile devices 100 can be further secured to a helmet 90. The headset for mobile devices 100 further includes lighting devices 112, 115, and 108. FIG. 1A further illustrates a controller 116 for use with the headset for mobile devices 100, which includes a series of control buttons 117, 118, and 119.

The helmet 90 can be any type of headgear that can accommodate headset for mobile devices 100, alternatively, the headset for mobile devices 100 can be incorporated directly into the helmet 90 can as shown in FIG. 1A. The helmet 90 can be a solid rigid construction and or it can contain ventilation for improved airflow. The headset for mobile devices 100 is configured to accommodate different shapes, designs and constructions of headgear or helmets 90.

The embodiment illustrated in FIG. 1A utilizes a housing 121 including a screw 105 and nut 106 to secure the mobile device 103, however, alternate embodiments can use a spring lock fast release mechanism or alternative locking mechanisms to securely hold the mobile device 103 in the headset for mobile devices 100. The embodiment of the housing 121 illustrated in FIG. 1A includes a first housing portion 122 on the visor frame 101 and a second housing portion 123 on the front assembly 104 which are joined to form the housing 121.

As illustrated in FIG. 1A, the mobile device 103 is affixed adjacent to the display screen 125 to allow the screen of the mobile device 103 to reflect onto the display screen 125. In this embodiment, the visor frame 101 includes a flat angled reflecting panel as the display screen 125. In alternative embodiments the display screen can comprise between 10% and 25%, between 25% and 50%, greater than 50%, or greater than 75% of the visor frame 101. The display screen can be composed of a single one-way mirror. The display screen 125 can be prepared from a reflecting material that wraps across the entire visor frame 101. The display screen 125 can further be configured to provide unobstructed peripheral vision while simultaneously providing a forward instrumentation display. Alternative transparent materials for the display screen 125 include a one-way mirrored material, plexiglass, acrylics, plastics, a transparent organic light emitting diode (OLED) display, and/or glass.

The ability of the display screen 125 to reflect the screen of the mobile device 103 in a viewable and partially transparent manner is a phenomenon known as Pepper's ghost (or the Pepper's ghost effect/illusion). Pepper's ghost is an illusionary technique used by magicians, attraction designers, and others to produce an illusion of a latent or -like image. Using a piece of transparent material with special lighting techniques and/or partially reflective mirrored materials, Pepper's ghost systems can make objects appear and disappear into the viewing display area. The headset for mobile devices 100 employs the Pepper's ghost effect using the display screen 125 as the semitransparent projection surface, and the screen of the mobile device 103 as the source of the image.

The Pepper's ghost effect allows an image rendered on the mobile device 100 to be reflected and mirrored (provide a mirror image) onto a display screen 125. Because of the mirror effect, the image rendered on the mobile device 100 will be upside down, but when reflected and mirrored onto the display screen 125 the image will appear normal, upright, and clearly viewable to the user.

In an embodiment the mobile device 103 executing an application 200 configured for the headset for mobile devices 100 can display a laterally inverted image, reflected and mirrored, preferably at maximum brightness, dark backgrounds, and with bright highlighted text and symbols. All references to the application 200, refer to the use of a processing device, located in the mobile device 103 or elsewhere, that is capable of executing the application 200 discussed herein. The use of maximum brightness, dark backgrounds, and highlighted text and symbols assists with the highest level of clarity for the mirrored image. Variations in the level of brightness, darkness of background and level of highlights to the text and symbols can be varied to produce an optimal Pepper's ghost effect. The application can be configured to display the image at a set brightness level, a set background darkness level, and a set brightness level for highlighted text and symbols. Further, the application can be configured to display the image at maximum brightness, maximum background darkness, and maximum brightness of highlighted text and symbols.

The processing device is configured to execute an application 200 on the mobile device 103, wherein the processing device controls screen controls configured to produce an image on a screen of the mobile device 103 configured to be reflected on a display screen 125 external to the mobile device 103; geolocation data from a mobile device 103 configured to be reflected on the display screen 125 external to the mobile device 103; gyroscopic data from the mobile device 103 configured to be analyzed by the processing device and used to generate safety warning and/or to display information on the display screen 125 external to the mobile device 103; a left turn signal received from a controller 116 and the sending of a signal to a left lighting device 108; a right turn signal received from the controller 116 and the sending of a signal to a right lighting device 115; a change direction signal received from the controller 116 and the sending of a signal to a rear lighting device 112; and a speed change signal received from the controller 116 and the sending of a signal to a rear lighting device 112.

The processing device additionally is configured to display an image on the screen of the mobile device 103 laterally inverted at a set brightness level, a set background darkness level, and a set brightness level for highlighted text and symbols. The processing device is further configured to recognize voice commands from a microphone on the mobile device 103 and send voice commands from a speaker on the mobile device 103. The sending and receiving of audio can be done by a peripheral device. The processing device can also be configured to send information to the screen of the mobile device 103, and/or send information audibly via speakers on the mobile device or peripheral devices, the information including: music currently being played on the mobile device; traffic conditions received from the mobile device; weather information received from the mobile device; and phone calls or texts received on the mobile device. The peripheral devices can further be configured to provide medical or health data from a user; electronically store music; obtain and deliver traffic data; obtain and deliver weather data; provide geolocation data; include microphones for use with the mobile device and/or speakers for use with the mobile device.

Text messages can be sent audibly via text to speech software executed by the processing device. The processing device is further configured to process voice commands from a user and send signals to a left lighting device 108, a right lighting device 115 and/or a rear lighting device 112, and then the processing device can turn off the lighting devices after a set period of time or after the processing device detects the user has performed an action, such as turning right or stopping. The processing device can determine the user has performed an action through use of the geolocation and/or gyroscopic features of the mobile device 103.

The Pepper's ghost effect can provide various visual feedback to the user in a non-intrusive manner. The images can be reflected and mirrored onto the display screen 125, preferably into the top half of the user's field of vision. In alternate embodiments, the images are reflected and mirrored into (occupy) the top 75% to 25% of the user's field of vision, the top 50% to 25% of the user's field of vision, or top 25% to 10% of the user's field of vision. Embodiments including a reflecting material such as a one-way mirror for the display screen 125 to protect the user's vision from bright lights such as the sun or oncoming headlights. The net effect provides the user with a headset for mobile devices 100 that can display information and/or images onto a display screen 125 received from the user's mobile device 103. Examples of one-way mirrors or transparent mirrors, are one-way mirrors made when a thin metallic reflective coating that has been applied all over the glass. The thin coating, often called a half-silvered surface, allows the reflective molecules in the coating to make the mirror half opaque. The image produced by the screen of the mobile device is then reflected on an external display screen, such as the display screen 125. In alternate embodiments, the image is sent wirelessly or via cable to a display screen configured to render an image.

There are numerous entertainment and other settings where it is desirable to create a unique visual display. The headset for mobile devices 100 can be used in concerts to add effects to a live show, theme parks to add features to a live event, walking to provide additional information or stimulus to the environment, or while at a resting position to read or watch entertainment.

Embodiments of the headset for mobile devices 100 can be used for various activities where the safety of the activity is greatly improved by use of headgear and/or by clear visual signaling cues.

Embodiments of the headset for mobile devices 100 can be used in underground activities when there is an available underground wireless communications network, and/or if the sensors employed for the performance tasks can function solely using the internal features of the mobile device 103. In a dark environment the headset for mobile devices 100 can improve safety by providing exterior illumination and relevant data on the display screen 125. The headset for mobile devices 100 can further provide audible information via speakers on the mobile device 103, speakers located on the headset for mobile devices 100, and/or peripheral devices. In the event of limited or no cellular or WIFI service, the geolocation service of the mobile communication device 103, can be limited or non-existent, however, speed and direction information can be provided by internal features of the mobile device and/or other relevant data can be projected onto the display screen 125 and/or provided audibly.

The visor frame 101 can be prepared in various dimensions and shapes. Preferably the visor frame 101 is large enough to block external light from the display screen 125 without blocking necessary peripheral angles for the user. The visor frame 101 can be prepared from plastics, ceramics, and/or light weight metals.

As illustrated in FIG. 1A, the front assembly 104 is securely mounted via a series of straps 107, buckles 113, and pegs 114 to the helmet 90. The number, length, and width of straps 107, buckles 113, and pegs 114 can be varied in view of the overall weight and dimensions of the headset for mobile devices 100 and the size and dimension of the headgear or helmet 90. The straps 107, buckles 113, and pegs 114 can be prepared from metals, fabrics, plastics, and/or leather. The pegs 114 assist in attaching the front assembly 104 and rear assembly 110 to the helmet 90. Alternative embodiments include the front assembly 104 mounted to the helmet 90 via fasteners, clips, joints, or other attachments. The headset for mobile devices 100 is configured to attach to a helmet 90 via adjustment and connection of the straps 107 and the buckles 113, and adjustment connection of the left lighting device 108 and right lighting device 115 with the lighting device connectors 130. These features can be adjusted to fit different size helmets 90 and/or alternative headwear. Additionally, in embodiments the front assembly 104 and base assembly 110 can be incorporated directly and/or molded into the helmet 90.

Figure 1B:
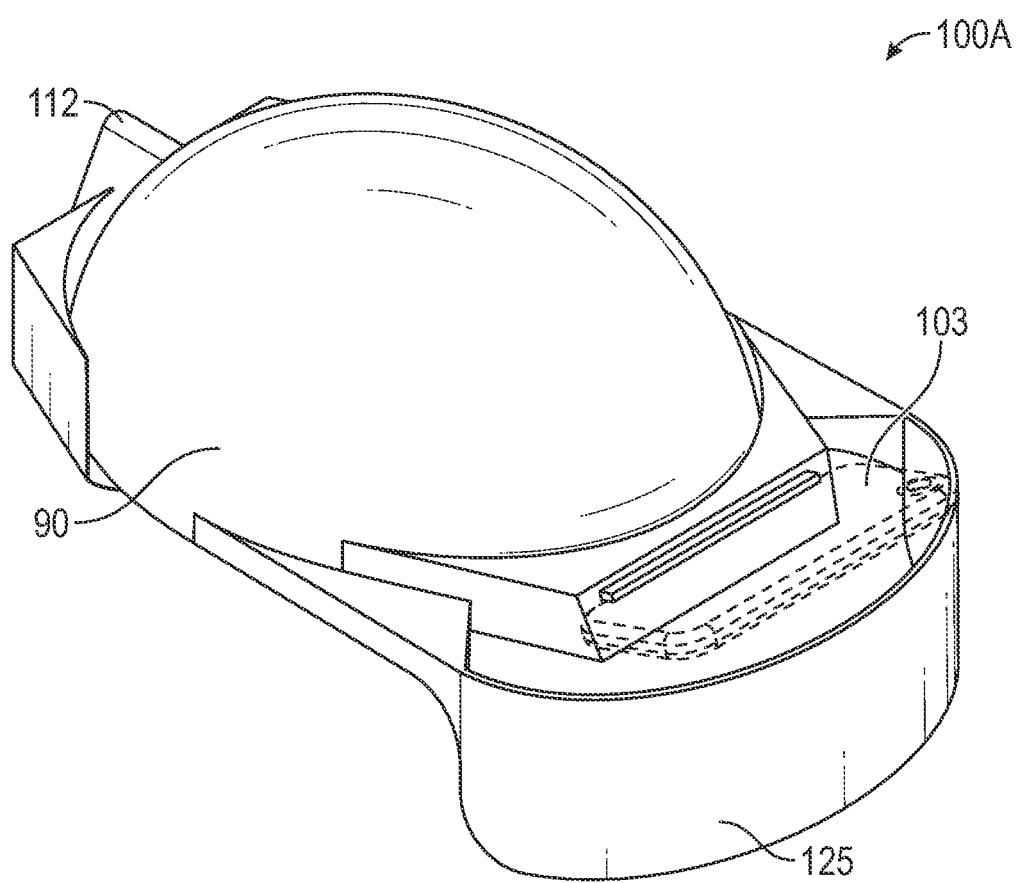
FIG. 1B is a perspective view of an alternative embodiment of the headset for a mobile device.

FIG. 1B further illustrates the mobile device connector 102 electronically connecting the mobile device 103 to the headset for mobile devices 100. Embodiments can include a mobile device connector 102 that is a USB-C cable. A USB-C cable allows for various types of mobile device to be attached to the headset for mobile devices 100, increasing the number of mobile devices 103 that are capable of being used with the headset for mobile devices 100. Alternate mobile device connectors 102 include ethernet cable connectors, firewire connectors, USB-C extension connectors, and/or microphone connectors. In the embodiment illustrated in FIG. 1A a wire or cable 128 connects the mobile device connector 102 and the microcontroller connector 109 in the rear assembly 111. In alternative embodiments, the mobile device 103 and the microcontroller connector 109 can be linked wirelessly.

Bluetooth is a short-range wireless technology standard that is used for exchanging data between fixed and mobile devices over short distances using UHF radio waves in the ISM bands, from 2.402 GHz to 2.48 GHz, and building personal area networks (PANs). Bluetooth operates by the principal where a Bluetooth peripheral device is paired with a Bluetooth control unit. Typically, mobile devices act as Bluetooth control units where Bluetooth peripheral devices (headphones, smart watches, other smart wearable or non-wearable devices) are discovered and paired with the mobile device. Bluetooth low energy (BLE) is a subset specification of Bluetooth that enables similar signaling between different types of Bluetooth devices at reduced power utilization but for simple data transfers. Peripherals, and preferably BLE peripherals, are often considered for mobile devices. Example of BLE peripherals may include but not limited to Bluetooth key fobs, Bluetooth mouse, Bluetooth headphones, Bluetooth smart watches, or Bluetooth keyboard. The peripheral devices can provide input to the mobile device 103 after the user has paired the peripheral device with the mobile device 103. Peripherals that use standards other than BLE can also be used with the headset for mobile devices 100.

Figure 10:
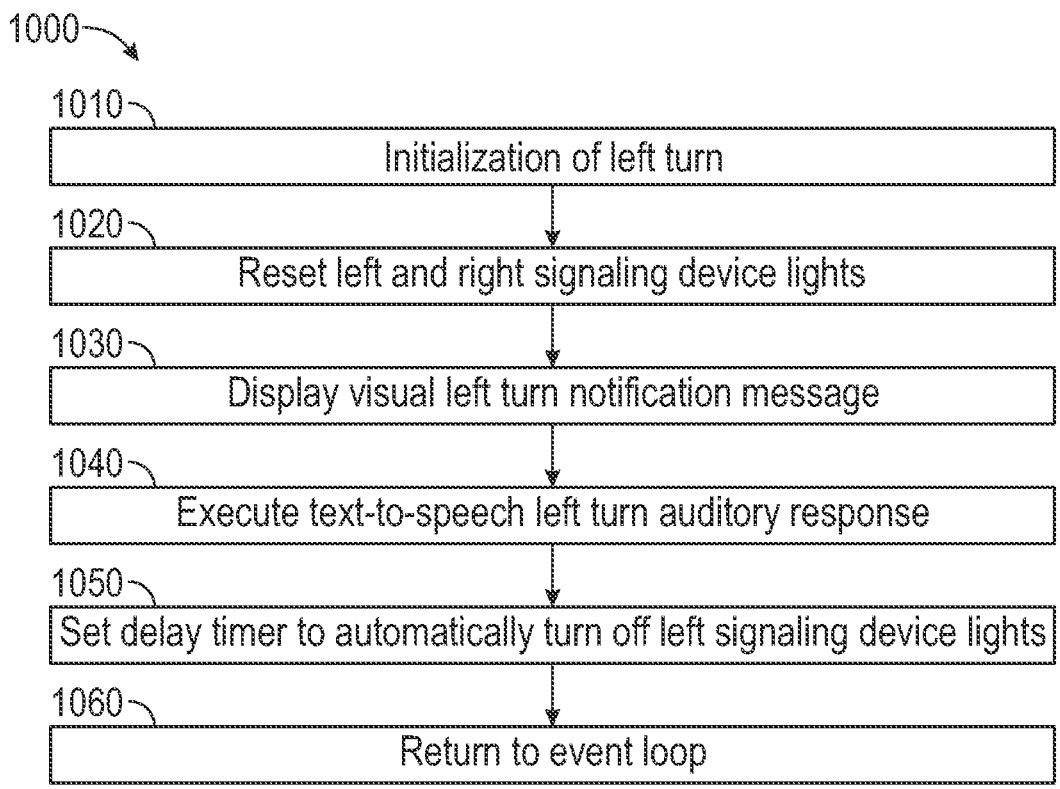
FIG. 10 is a flowchart of an application for the headset for a mobile device.
Figure 11:
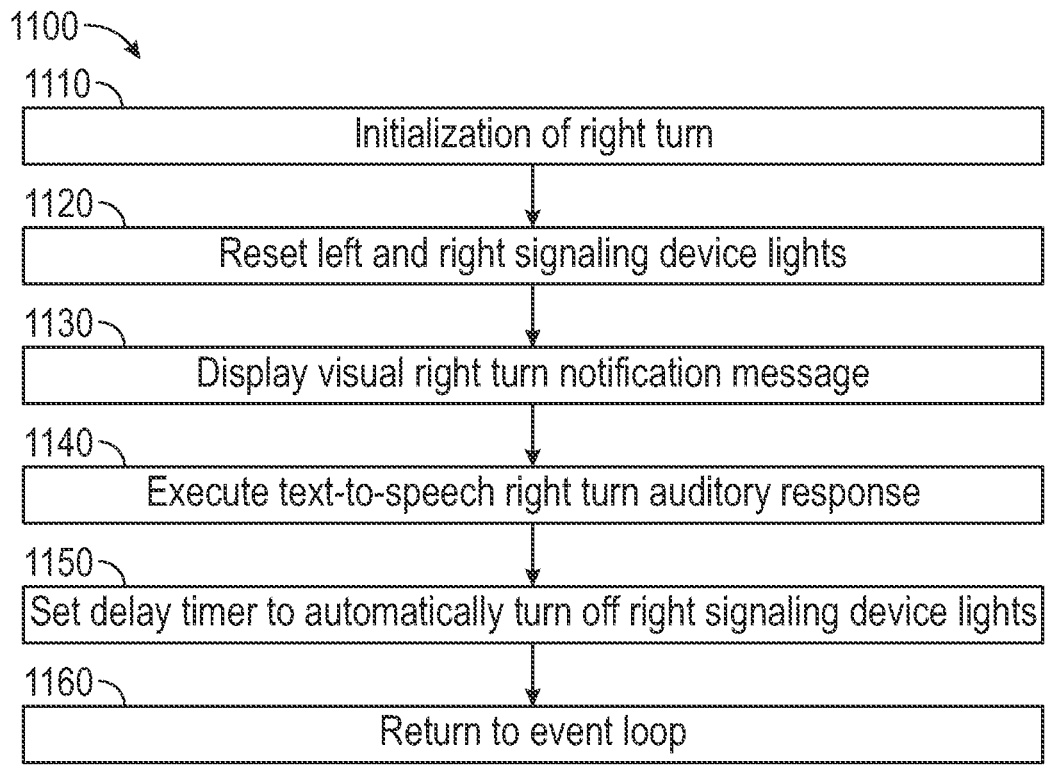
FIG. 11 is a flowchart of a right turn task performance for an application configured for the headset for a mobile device.
Figure 12:
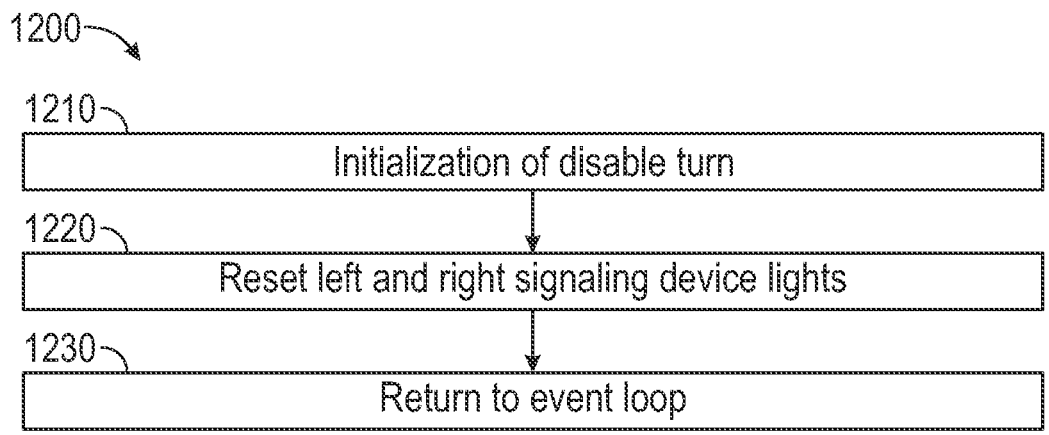
FIG. 12 is a flowchart of a disable turn task performance for an application configured for the headset for a mobile device.

Embodiments of the headset for mobile devices 100 can operate cooperatively with peripherals, for example, the headset for mobile devices 100 can employ a wireless controller 116, paired with the mobile device 103, that can be securely mounted on a bicycle handle. The controller 116 can include preset control buttons, such as a left arrow control button 117, a right arrow control button 119, and a middle control button 118. Signals from the control buttons 117, 118, and 119 sent to the processor that executes the application 200 can perform pre-set tasks. The control buttons 117, 118, and 119 can be configured to operate the associated lighting devices, for example the left lighting device 108, right lighting device 115 and rear lighting device 112. Examples include a left turn signaling task, an example of which is illustrated in FIG. 10, a right turn signaling task, an example of which is illustrated in FIG. 11, and a disable signaling task, an example of which is illustrated in FIG. 12. The control buttons 117, 118, and 119 and the application 200 allow the user to conveniently and easily use the headset for mobile devices 100 to perform signaling tasks. Embodiments of the headset for mobile devices 100 can employ wired or wireless controllers 116 (Bluetooth, BLE, for example) integrated or augmented to the riding vehicle. Examples include controllers 116 installed onto the left and right handle bars of a bicycle, to send signals to the application 200. Further embodiments allow the user to send input to the application 200 via voice commands received by a microphone on the mobile device 103, microphones located on the headset for mobile devices 100, and/or peripheral devices.

The lighting devices 108, 112, and 115 are incorporated into the headset for mobile devices 100 at various locations to provide information to others in the environment of the user. The lighting devices can provide safety information or have aesthetic use. The lighting devices can include strands running from the base assembly 110 to the front assembly 104, or affixed to the straps 107. Examples of the lighting devices are a right lighting device 115 and a left lighting device 108, as shown in FIG. 1A. Additionally, the lighting devices can be affixed to the rear assembly, such as rear lighting device 112. Lighting devices can be located at other positions on the headset for mobile devices 100 such as across the top of the helmet 90 or even on the visor frame 101. The lighting device 108 and 1115 are linked to the front assembly 104 and base assembly 110 via channels or lighting device connectors 130.

The lighting devices 108, 112, and 115 are designed to signal information to others in the environment of the user. The signals can include, but are not limited to, a right turn, a left turn, stopping, slowing down, speeding up, emergency (hazard), or slow movement. Alternatively, the lighting device can provide decorative or aesthetic designs, such as rainbows, holiday colors, sports team colors or other designs or color patterns. In one embodiment, the lighting device 112 on the rear assembly 111 is in the shape of a triangle, and the right lighting device 115 and left lighting device 108 are in strips. The shape, size, length, brightness, and/or colors can be varied in view of different requirements of the user. Embodiments of the headset for mobile devices 100 employ lighting devices 108, 112, and 115 prepared from individually addressable IP65 rated light emitting diodes (LED) strip lights, Regular (not individually addressable) LED strips, active matrix organic light emitting diodes (AMOLED), liquid crystal display (LCD), and/or OLED screen displays.

Embodiments of the headset for mobile devices 100 can include additional safety features, including electronic sensors and emitters that detect nearby motion. The detectors and emitters can be configured to alert the user to objects in the vicinity of the user, such as cars, bicycles, stationary objects, and/or pedestrians that have entered into a set range of the user. Alternatively, the sensors and emitters can issue a signal, via Bluetooth, infrared, and/or radio frequency identification (RFID) that interact with detection systems in existing non-stationary objects, such as cars, bicycle, pedestrians, and/or smart safety helmets of others, or stationary objects, such as traffic signs, traffic lights, street lights, location signs, road reflectors, buildings, stores, and houses. As an example, the signal can interact with a sensor on a car (an external device, which can send and/or receive external signals) and alert the driver of the car by activating a light on the dashboard or side view mirror that object are nearby. Many cars already have side warning systems that can be configured to accommodate the signal from the headset for mobile devices 100. Additionally, the headset for mobile devices 100 can be configured to alert other users with the headset for mobile devices 100, or similar smart devices.

Embodiment of the headset for mobile devices 100 can be configured to receive signals from stationary objects, such as traffic signs, traffic lights, street lights, location signs (street signs/highway extra ramp signs), road reflectors, buildings, stores, houses, or any existing structure. These signals can provide additional information to the user in instances where the stationary object, such as a stop sign was blocked visually, by a tree, truck or other object. The information can then be configured by the mobile device and displayed on the display screen 125 or delivered audibly to the user. Embodiments can provide current traffic, and/or road conditions to the user.

FIG. 1A illustrates the controller 116 for the headset for mobile devices 100. The controller 116 includes three separate control buttons 117, 118 and 119. The control buttons are configured to send a signal to the headset for mobile devices 100 to trigger or engage features of the headset for mobile devices 100, such as the lighting devices 108, 112, and/or 115. The embodiment illustrated in FIG. 1A includes a left turn control button 117, a middle control button 118, and a right turn control button 119. Alternate embodiments can include additional or less control buttons that are configured to operate different features of the headset for mobile devices 100. The embodiment illustrated in FIG. 1A is a wireless controller 116 that can be affixed to an external transportation device, such as the handle of a bicycle. The controller 116 can be configured to be affixed to various transportation devices, as well as the to the body of the user, such as a hand or a wrist, or an article of clothing of the user, such as a sleeve or a lapel. Alternative embodiments of the controller 116 can be wired into the transportation device or directly wired to the headset for mobile devices 100.

FIG. 1A illustrates an embodiment of the headset for mobile devices 100A including a helmet 90 with a display visor 92, a mobile device 103, and a lighting device 91.

The embodiment illustrated in FIG. 1A incorporates the elements of the mobile devices 100A without the need for straps 107, buckles 113 or pegs 114 by building and/or constructing these features directly into the helmet 90 itself. Similar to the embodiment of FIG. 1A, the headset for mobile devices 100A affixes the mobile device 103 adjacent to the display screen 125 to allow the screen of the mobile device 103 to be mirrored on the display screen 125. Additionally, the rear lighting device 112, rear assembly 111 and other lighting devices can be incorporated directly into the helmet 90.

Figure 2:
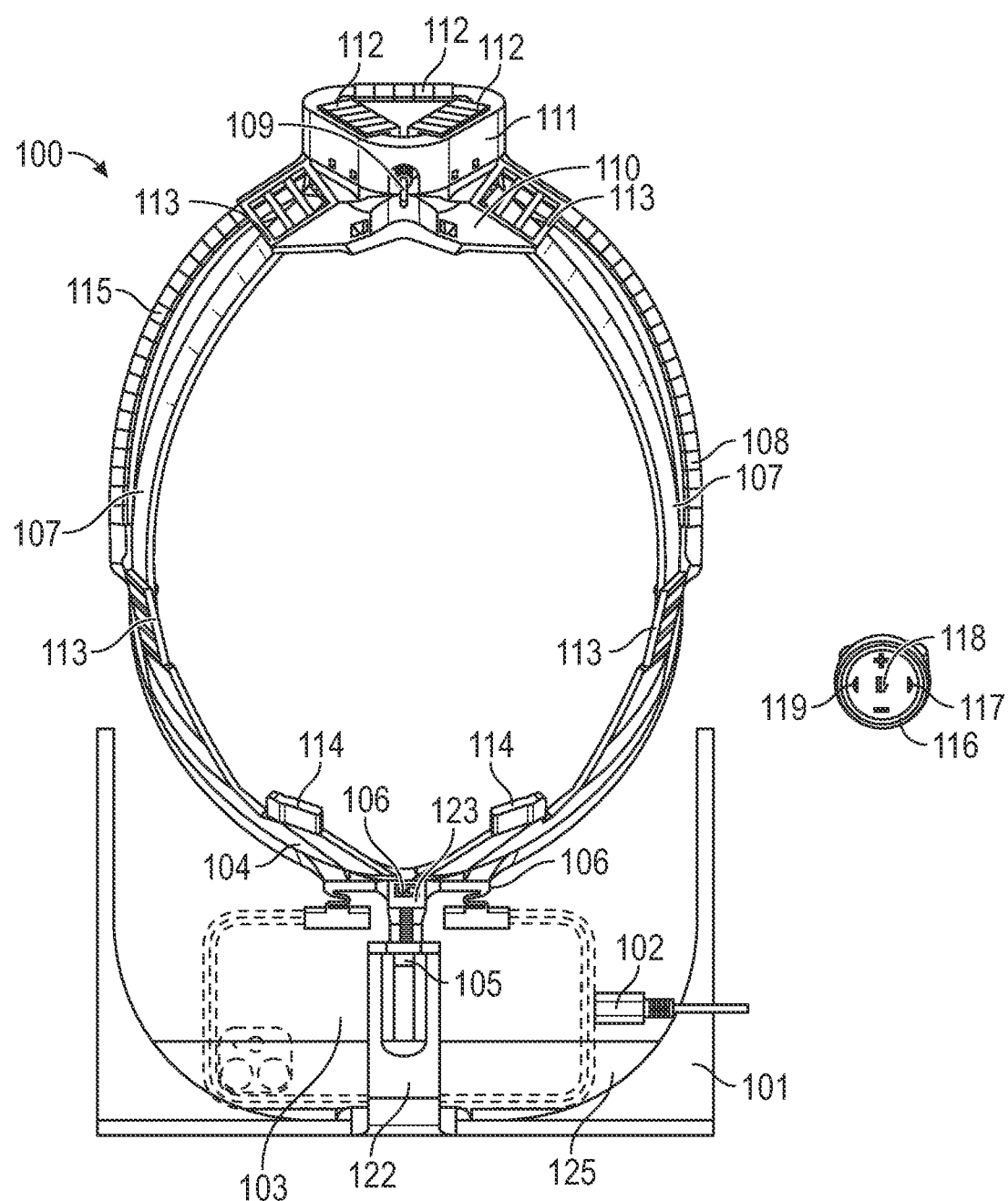
FIG. 2 is a top view of the headset for a mobile device with a controller.

FIG. 2 illustrates a top view of an embodiment of the headset for mobile devices 100. FIG. 2 illustrates the straps 107, buckles 113 and pegs 114 located along the base of the helmet 90. In alternate embodiments the straps 107, buckles 113 and pegs 114 can be located at the base of the helmet 90 and across the top of the helmet 90. Embodiments where lighting device connectors 130 are located across the top of the helmet 90 will allow for lighting devices to be located on the top portion of the helmet 90. In one embodiment, the housing 121 may connect the front assembly 104 to the visor frame 101 via the screw 105 and nut 106. FIG. 2 further illustrates the triangle configuration of the rear lighting device 112 affixed to the rear assembly 111. The triangle configuration is one possible shape for the lighting devices. Alternate shapes can include squares, circles, lines, hexagons, ovals, stars, or any shape compatible with the size of the rear assembly 111.

Figure 3:
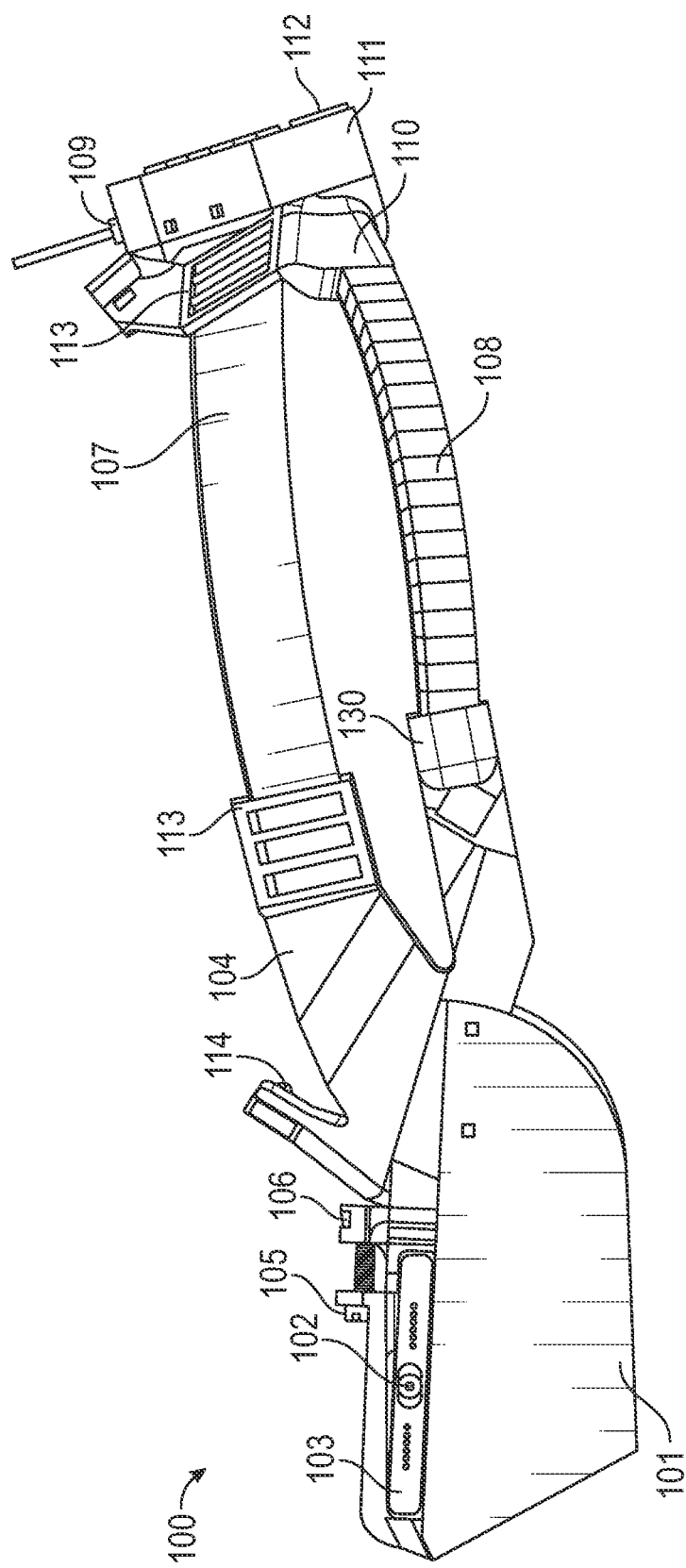
FIG. 3 is a side view of the headset for a mobile device.

FIG. 3 illustrates a side view of the headset for mobile devices 100 detached from the helmet 90. The headset for mobile devices 100 can be a separate device that is attached to headgear such as a helmet 90, or the headset for mobile devices 100 can be incorporated directly into headgear such as the embodiment shown in FIG. 1A.

FIG. 3 further illustrates the lighting devices, such as left lighting device 108 running generally parallel to strap 107. The left lighting device 108 runs the length from the base assembly 110 to a lighting device connector 130 on the front assembly 104. The strap 107 runs from the base assembly 110 to the buckle 113 attaching the strap 107 to the front assembly 104. Embodiments can include lighting devices that encompass the entire length between the front assembly 104 and the base assembly 110, or portions of the distance.

Figure 4:
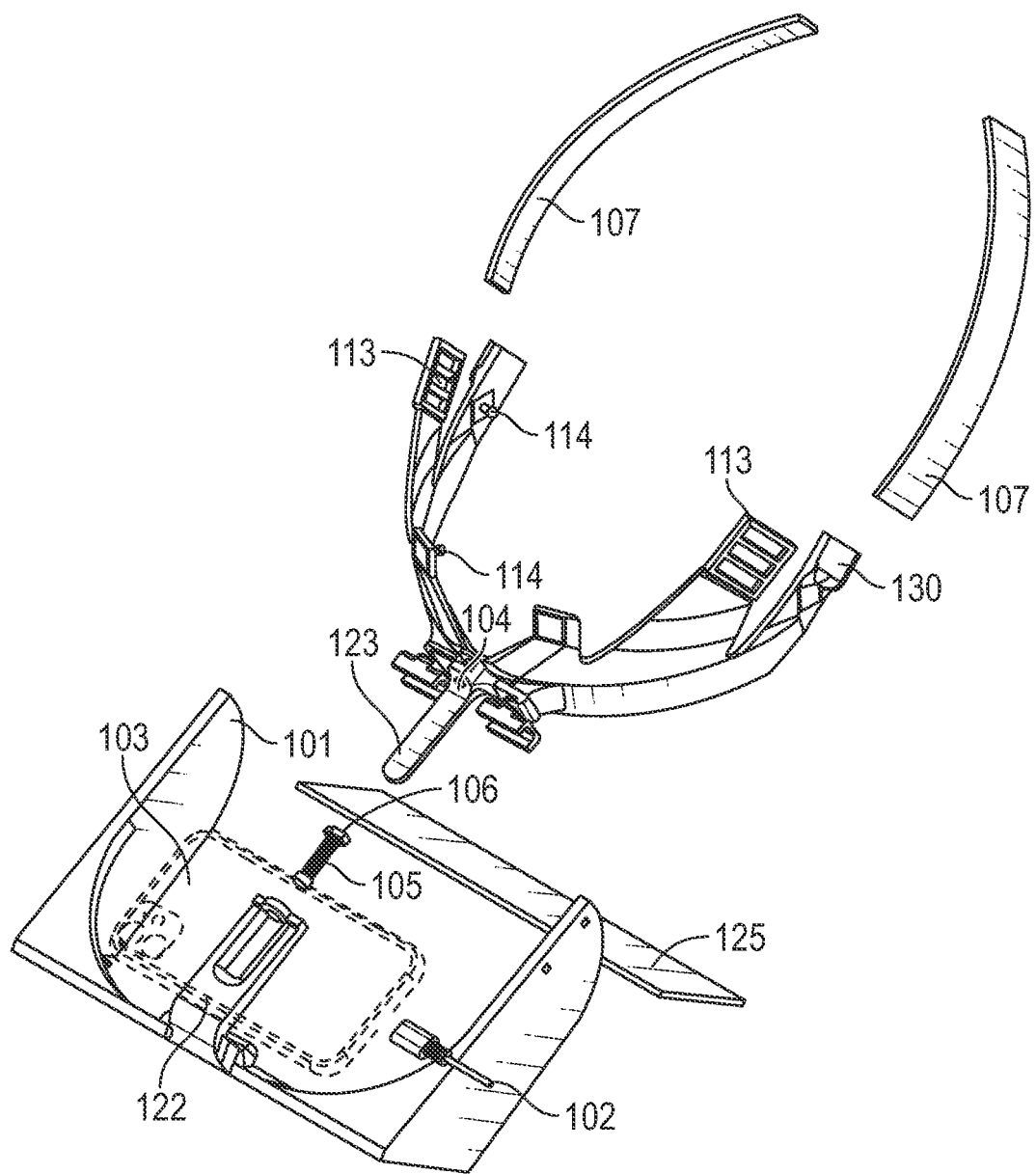
FIG. 4 is an exploded perspective view of the front assembly of the headset for a mobile device.

FIG. 4 is an exploded view of an embodiment of the headset for mobile devices 100. FIG. 4 illustrates the individual portions of the front assembly 104 that engage the portions of the visor frame 101 to form the housing 121 that links the two components. In the exploded embodiment the screw 105 and nut 106 are detached from the housing 121 and the first and second portions of the front assembly 104 and visor frame 101 are shown before overlapping to form the housing 121. Additionally, the mobile device 103 is held securely in the headset for mobile devices 100 by the attachment of the front assembly 104 and visor frame 101 via tightening of the screw 105 and nut 106. Alternative components can be employed to secure the mobile device 103 to the headset for mobile devices 100.

FIG. 4 illustrates the display screen 125 detached from the visor frame 101. The embodiment of the headset for mobile devices 100 includes a flat rectangular display screen. In alternate embodiments the display screen 125 can be oval, square, curved, elliptical, or any shape, and curvature suitable for displaying an image to the user. Additionally, the height and length of the visor frame 101 and display screen can be varied to accommodate different size mobile devices and/or to allow more or less peripheral light to reach the user.

FIG. 4 further illustrates the straps 107 disengaged from the buckles 113. The strap 107 and buckle 113 arrangement of the headset for mobile devices 100 allows for use with different size helmets 90 or other headgear. The use of the straps 107 and buckles 113 allow a user to easily transfer the headset for mobile devices 100 between different helmets, such as a bicycle helmet to a skiing helmet.

Figure 5:
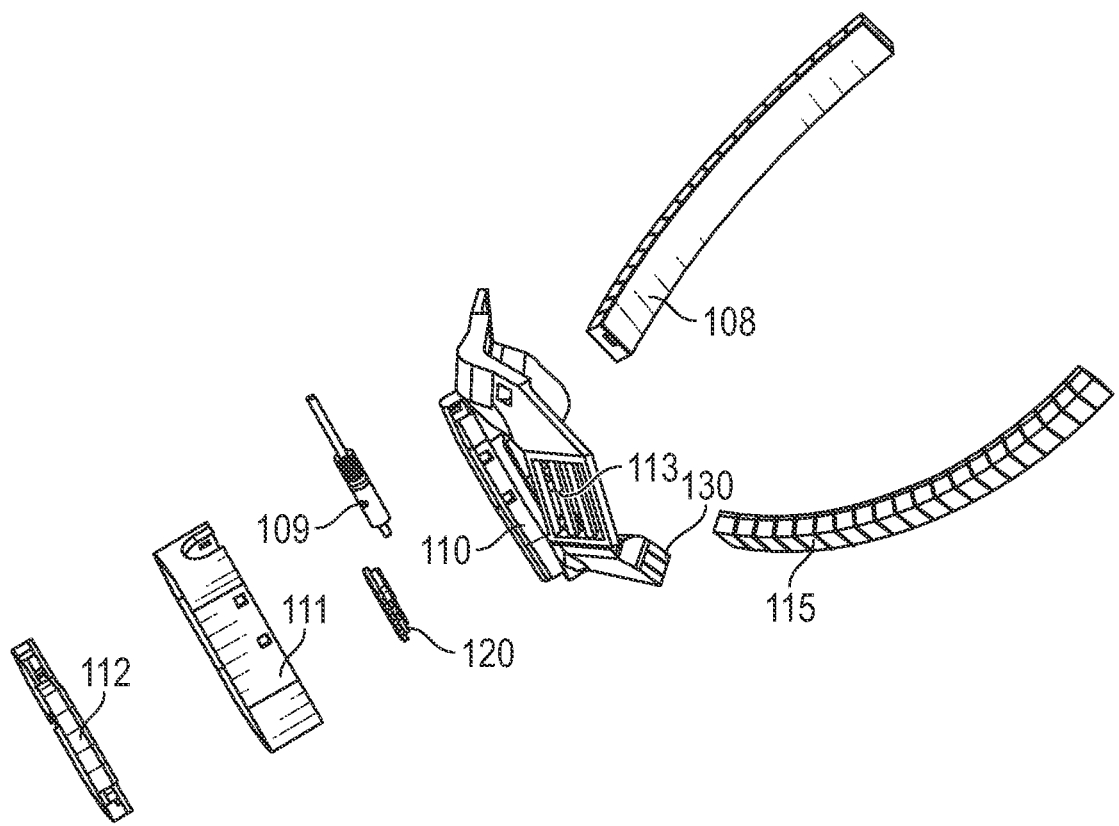
FIG. 5 is an exploded perspective view of the rear assembly of the headset for a mobile device.

FIG. 5 is an exploded view of the rear assembly 111 and base assembly 110 of an embodiment of the headset for mobile devices 100. The rear assembly 111 includes a microcontroller 120, a microcontroller connector 109, and rear lighting devices 112. The base assembly links with the left lighting device 108 and the right lighting device 115. The base assembly 110 further includes buckles 113 to link straps 107. The base assembly 110 further includes lighting device connectors 130 to link the lighting devices 108 and 115 to the front assembly 104 and base assembly 110. The rear assembly 111 is configured to be joined securely to the base assembly 110 by clips, fasteners, screws, and/or cable ties. Additional cable ties, clips, screws, and/or fasteners can be used for additional support to secure components of the headset for mobile devices 100. Fasteners, such as cable ties can be cut or removed to provide easy access to electrical components of the headset for mobile devices 100.

The rear assembly 111 houses the microcontroller 120 which receives power, information and commands from the mobile device 103 wirelessly or via connection by cable 128. In one embodiment, the mobile device 103 is connected to the mobile device connector 102 which is linked via a cable 128 to microcontroller connector 109 which attaches to microcontroller 120. Embodiments of the cable 128 can be a USB-C cable. In alternate embodiments, the mobile device 103 and microcontroller 120 are linked wirelessly.

In one embodiment the microcontroller 120 is an ATmega328 based Arduino commercially known as the Seeeduino XIAO. The compact, light and miniature nature of the microcontroller 120 allows for a light and sleek rear assembly. A smaller and lighter microcontroller 120, allows for a smaller and lighter rear assembly. Anywhere that size and weight can be removed from the headset for mobile devices 100 will be beneficial to the user. Alternative microcontrollers suitable for the headset for mobile devices 100 include the Arduino Uno, Arduino Nano, Arduino IDE compatible board XIAO, and microcontrollers available from On Semiconductors, Texas Instruments, ROHM semiconductors, Silicon Labs, Maxim Integrated, Zilog, NXP, Toshiba, ISSI, or Microchip Technology.

The microcontroller 120 controls the lighting devices 108, 112, and 115 based on inputs from the application 200 on the mobile device 103. In the embodiment employing LED lighting and a Seeeduino XIAO, only 5 volts of electricity from the mobile device 103 is required to power the lighting devices. Embodiments can be powered by 0.5 V, 1.5V or 3 V of electricity. This highly efficient system provides longer battery life for the headset for mobile devices 100. While the headset for mobile devices 100 is configured to be powered by the battery from the mobile device 103, the more efficient the overall headset for mobile devices 100 can be designed, the greater will be the increase to the available battery life.

Embodiments of the headset for mobile devices 100 can be weatherproofed to ensure seamless connectivity of the electronic components and continued functioning of the lighting devices. Preferably LED lights are employed for the lighting devices, which possess their own weatherproofing features. The additional components should be prepared from weatherproof materials or protected with weatherproofing.

Figure 6:
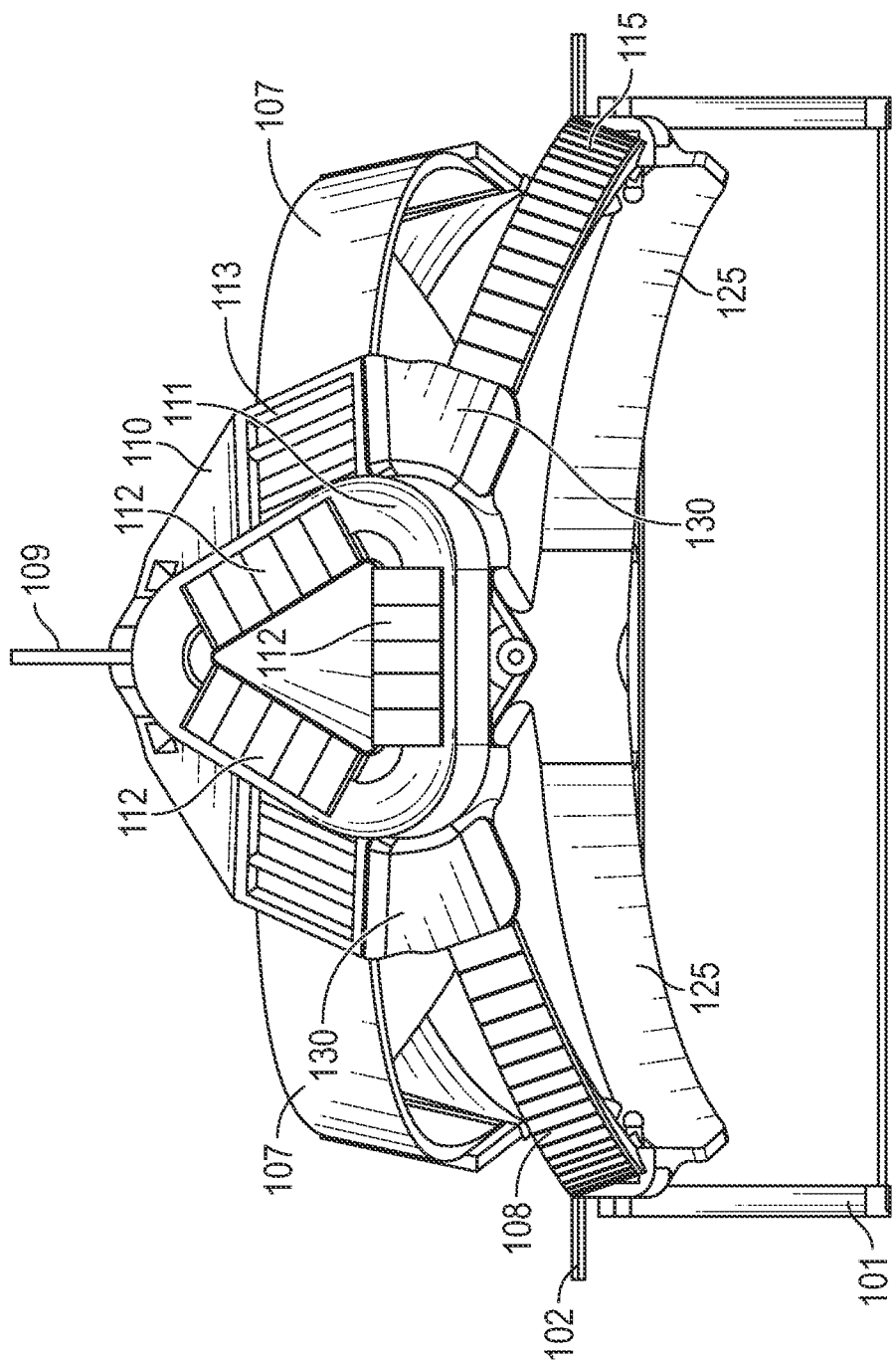
FIG. 6 is a rear view of the headset for a mobile device.

FIG. 6 illustrates a rear view of the headset for mobile devices 100. FIG. 6 illustrates the rear lighting device 112 affixed to the rear assembly 111 in a triangle configuration. Alternate shapes and designs can be employed for the lighting devices. The triangle configuration allows for a large section of the back of the headset for mobile devices 100 to be illuminated for safety and directional purposes. The rear lighting device 112 can be constantly lit at night to provide awareness to others in the environment of the user. Additionally, the rear lighting device 112 can flash and change colors to inform other that the user is slowing down, stopping, speeding up, or in distress (hazards/blinking). During normal operation the rear lighting device 112 can illuminate in a stationary light pattern or an in-motion light pattern depending on the speed sensed by the headset for mobile devices 100. Alternatively, the rear lighting device 112 can change illumination based on user commands via voice activation or the controller 116. In one embodiment, the stationary light pattern can be a rotating red light pulsing in a clockwise direction. In an alternate embodiment, the in-motion light pattern can be a pulsating rotating rainbow light effect. In an embodiment where the user triggers a left or right signal, the left lighting device 108 or right lighting device 115 can begin to start a red pulsing light that emanates from the rear base assembly 110 towards the front assembly 104. This signaling will continue until the user disables the signaling, or after a set delay time out period. The color, speed, direction and illumination of the lighting devices can be varied.

The headset for mobile devices 100 employs an application 200 that is run or executed on the mobile device 103. The application 200 can provide audio or visual feedback based on specific actions taken by the user, the user interactions with the headset for mobile devices 100, the users interactions with the controller 116, information provided by the mobile deice, 103 or stimulus/signals from the environment of the user. FIGS. 7-15 are non-limiting examples of flowcharts detailing tasks the application executes for the user.

Figure 7:
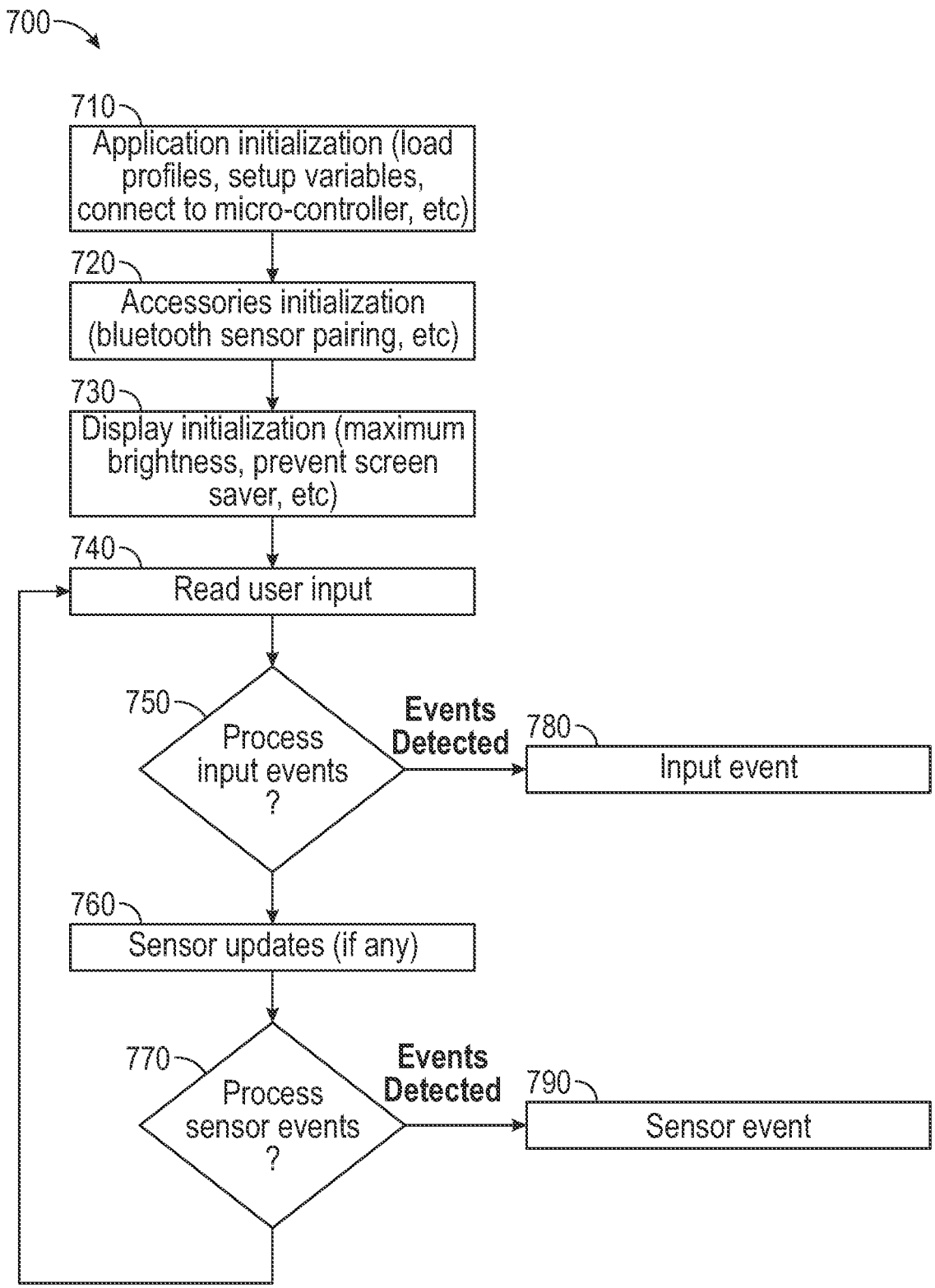
FIG. 7 is a flowchart of an application configured for the headset for a mobile device.

FIG. 7 is a flowchart of a task performance 700 for application 200 of the headset for a mobile device 100. The flowchart illustrated in FIG. 7 relates to the initial downloading and configuration of the application 200 for the headset for mobile device 100. Block 710 illustrates an initialization step for the application 200, wherein the application is loaded onto the mobile device 103, in which profiles, set-up variables, and connection information for the microcontroller 120 are loaded into the application 200, as well as access to location data, access to contacts, access to the microphone, access to the phone, access to internal files and access to media software. Block 720 illustrates additional steps of initializing the mobile device 103, including Bluetooth pairing, and/or Initialize external display, in embodiments not employing a Pepper's ghost display. Block 730 illustrates display initialization, including brightness level, prevention of screen savers or lock screens, text and symbol highlighting, and/or background darkness. Block 740 illustrates the application 200 receiving input from the user. Block 750 illustrates the application 200 processing input events. Block 780 illustrates the application 200 executing tasks related to the input events. Block 760 illustrates the application 200 updating senor updates. Block 770 illustrates the application 200 processing sensor events. Block 790 illustrates the application 200 executing tasks related to sensor events.

Figure 8:
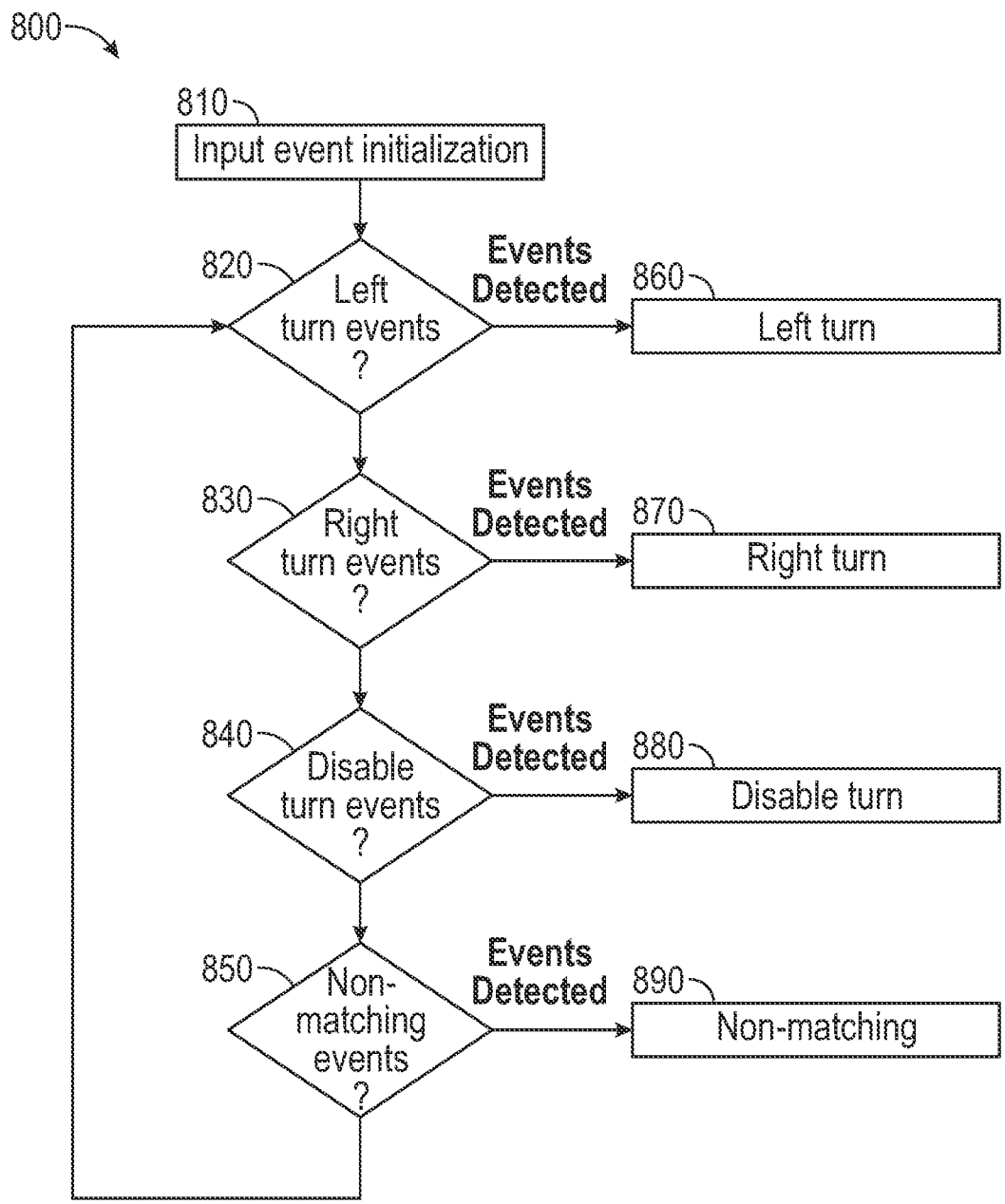
FIG. 8 is a flowchart of an application configured for the headset for a mobile device.

FIG. 8 is a flowchart of an input event task performance 800 for application 200 of the headset for a mobile device 100. The flowchart illustrated in FIG. 8 relates to input events initiated by the user for the application 200 on the mobile device 100. Block 810 illustrates an input event initialization step for the application 200. Block 820 illustrates a left turn event has been initiated. Block 860 illustrates a left turn event has been detected, and a left turn signal command has been sent to microcontroller 120. Block 830 illustrates a right turn event has been initiated. Block 870 illustrates a right turn event has been detected, and a right turn signal command has been sent to microcontroller 120. Block 840 illustrates a disable turn event has been initiated. Block 880 illustrates a disable turn event has been detected, and a disable turn signal command has been sent to microcontroller 120. Block 860 illustrates a non-matching event has been initiated. Block 890 illustrates a non-matching event has been detected, and the non-matching command has been sent to microcontroller 120.

Figure 9:
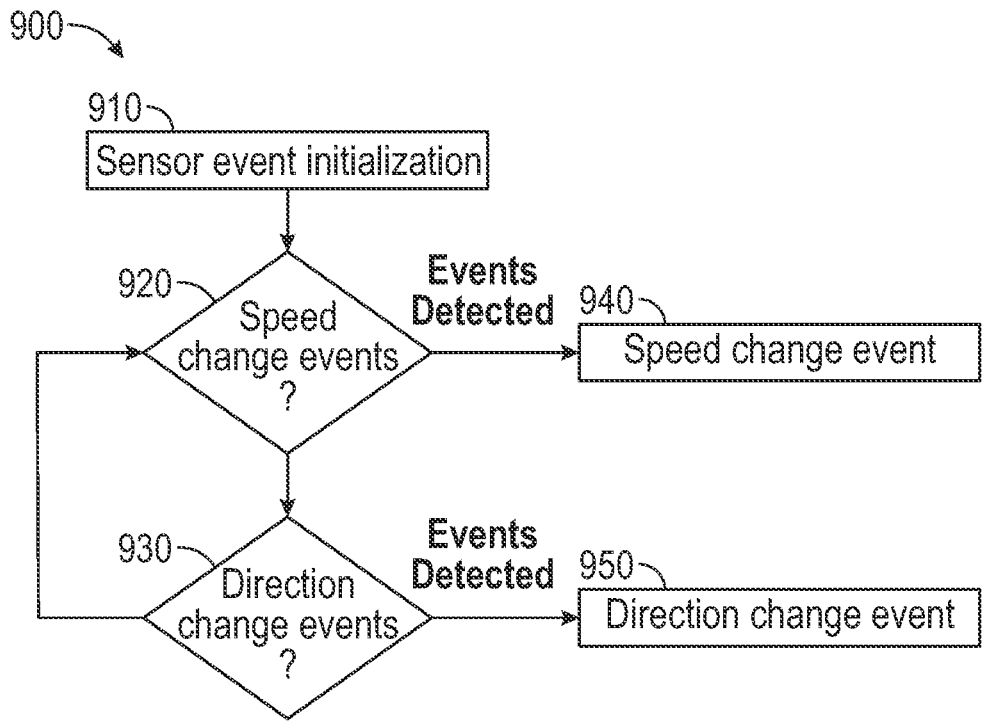
FIG. 9 is a flowchart of an application configured for the headset for a mobile device.

FIG. 9 is a flowchart of a sensor event task performance 900 for application 200 of the headset for a mobile device 100. The flowchart illustrated in FIG. 9 relates to a sensor event initiated by the application 200 for the headset for mobile device 100 based on events detected by a sensor in the mobile device 103. Block 910 illustrates a sensor event initialization step for the application 200. Block 920 illustrates a speed change event has been detected. Block 940 illustrates a speed change event has been detected, and a speed change signal command has been sent to microcontroller 120. Block 930 illustrates a direction change event has been initiated. Block 950 illustrates a direction change event event has been detected, and a direction change signal command has been sent to microcontroller 120.

FIG. 10 is a flowchart of a left turn task performance 1000 for application 200 of the headset for a mobile device 100. The flowchart illustrated in FIG. 10 relates to a left turn task performance 1000 executed on the application 200 for the headset for a mobile device 100 based on events detected by a sensor in the mobile device 103 or initiated by the user. Block 1010 illustrates a left turn initialization step for the application 200. Block 1020 illustrates a reset of the left lighting device 108 and right lighting device 115. Block 1030 illustrates displaying visual left turn signal notification on the display screen 125. Block 1040 illustrates an executing of text-to speech left turn auditory response executed by the mobile device 103 via speakers located on the mobile device, elsewhere on the headset for mobile device 100 or via peripheral devices. Block 1050 illustrates a time delay command which automatically turns off left lighting device 108 after a set period of time. Block 1060 illustrates a return to event loop for the application 200.

FIG. 11 is a flowchart of a right turn task performance 1100 for application 200 of the headset for a mobile device 100. The flowchart illustrated in FIG. 11 relates to a right turn task performance 1100 executed on the application 200 for the headset for mobile device 100 based on events detected by a sensor in the mobile device 103 or initiated by the user. Block 1110 illustrates a right turn initialization step for the application 200. Block 1120 illustrates a reset of the left lighting device 108 and right lighting device 115. Block 1130 illustrates displaying visual right turn signal notification on the display screen 125. Block 1140 illustrates an executing of text-to speech right turn auditory response executed by the mobile device 103 via speakers located on the mobile device, elsewhere on the headset for mobile device 100 and/or on peripheral devices. Block 1150 illustrates a time delay command which automatically turns off right lighting device 115 after a set period of time. Block 1160 illustrates a return to event loop for the application 200.

FIG. 12 is a flowchart of a disable turn task performance 1100 for application 200 of the headset for a mobile device 100. The flowchart illustrated in FIG. 12 relates to a disable turn task performance 1200 executed on the application 200 for the headset for mobile device 100 based on events detected by a sensor in the mobile device 103 or initiated by the user. Block 1210 illustrates a disable turn initialization step for the application 200. Block 1220 illustrates a reset of the left lighting device 108 and right lighting device 115. Block 1230 illustrates a return to event loop for the application 200.

Figure 13:
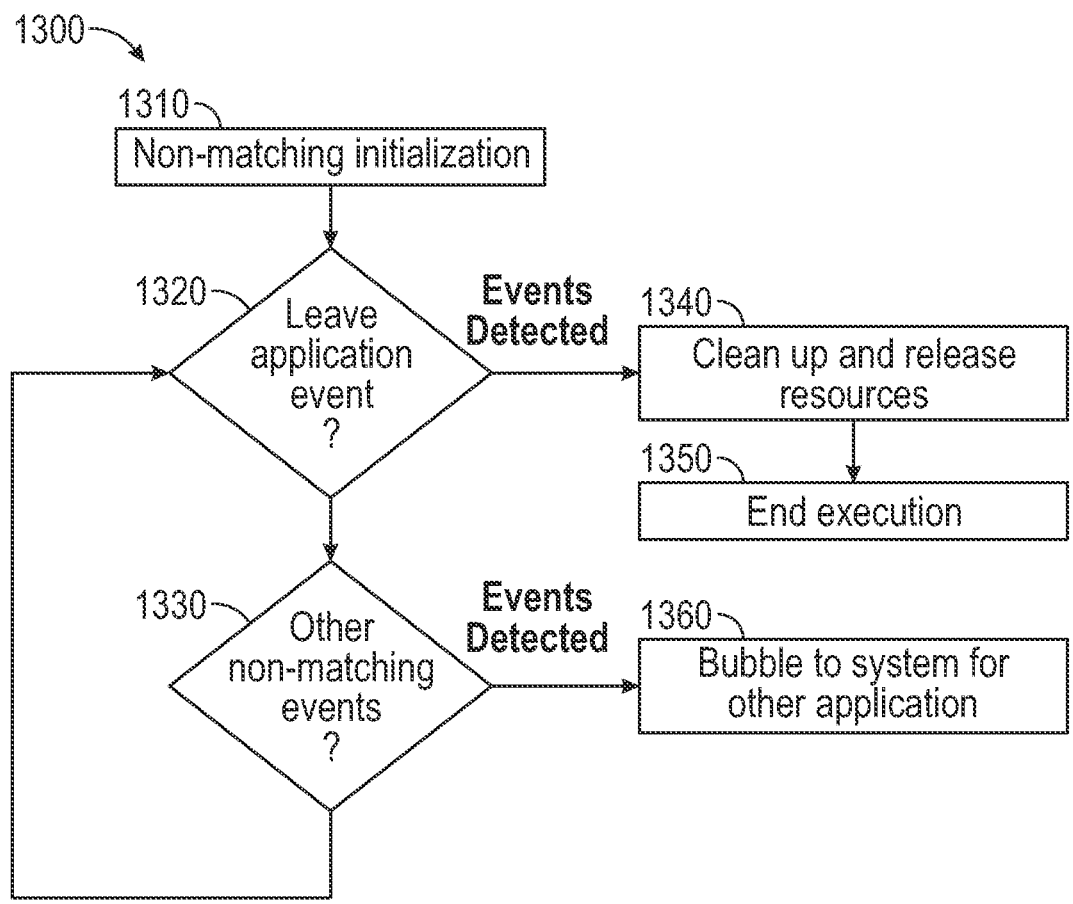
FIG. 13 is a flowchart of a non-matching task performance for an application configured for the headset for a mobile device.

FIG. 13 is a flowchart of a non-matching task performance 1300 for application 200 of the headset for a mobile device 100. The flowchart illustrated in FIG. 13 relates to a non-matching task performance 1300 executed on the application 200 for the headset for mobile device 100 based on events initiated by the user. Block 1310 illustrates a non-matching initialization step for the application 200. Block 1320 illustrates a leave application event. Block 1340 illustrates a leave application event has been detected and clean up and release of application resource has been initiated for the application 200. Block 1350 illustrates an end of execution of command executed in Block 1340. Block 1330 illustrates a non-matching event. Block 1360 illustrates a non-matching event has been detected and passed on to the operating system for other applications to perform other functionalities 200.

Figure 14:
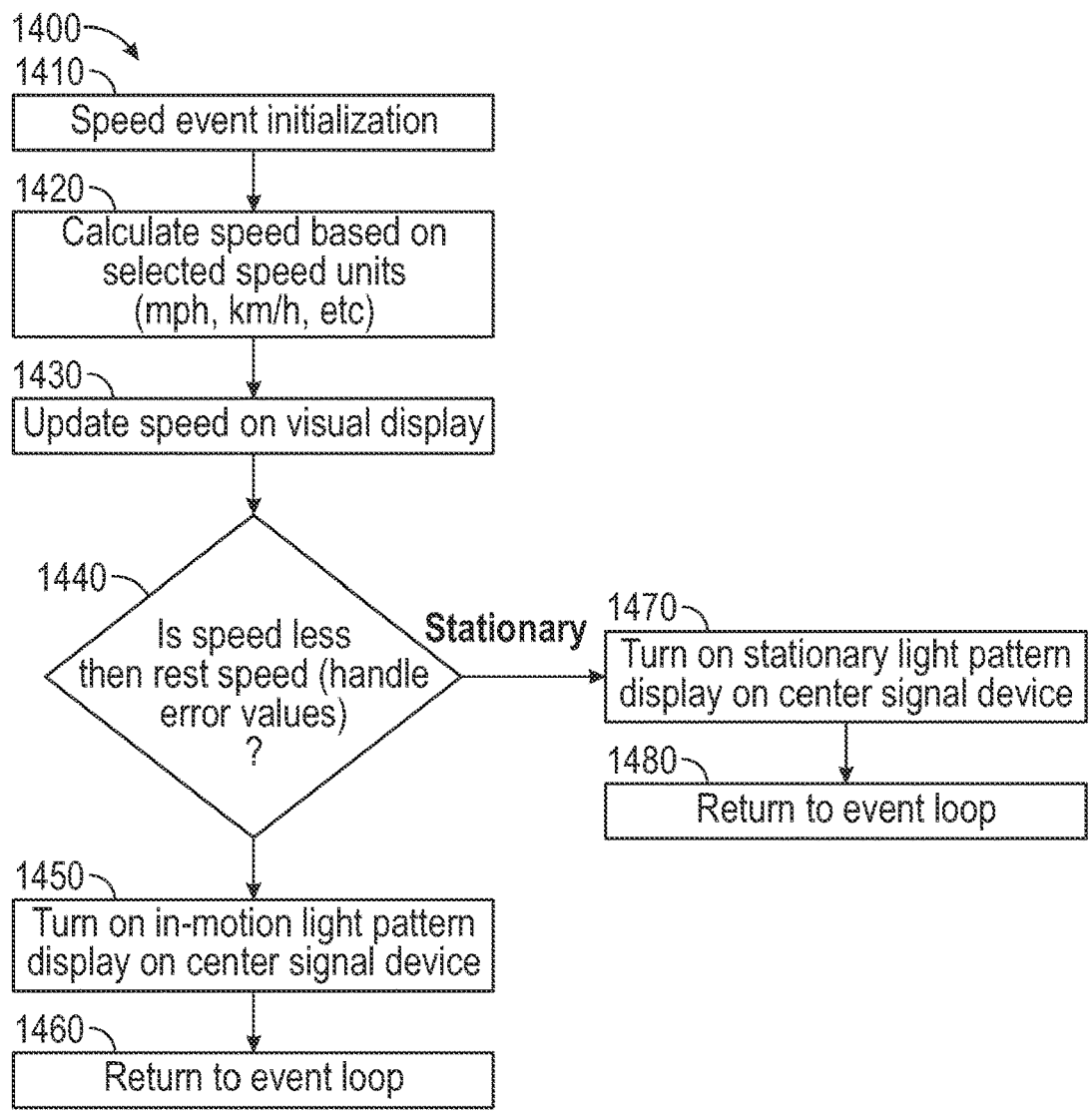
FIG. 14 is a flowchart of a speed event task performance for an application configured for the headset for a mobile device.

FIG. 14 is a flowchart of a speed event task performance 1400 for application 200 of the headset for a mobile device 100. The flowchart illustrated in FIG. 11 relates to a speed event task performance 1400 executed on the application 200 for the headset for mobile device 100 based on events detected by a sensor in the mobile device 103 or initiated by the user. Block 1410 illustrates a speed event initialization step for the application 200. Block 1420 illustrates a calculation of speed based on selected speed units, for including but not limited to, mph, km/h, and/or feet/sec. Block 1430 illustrates displaying visual speed data on the display screen 125. Block 1440 illustrates a calculation of speed versus rest speed. Block 1470 illustrates the calculation in Block 1440 has been determined to be stationary, and to execute a command to turn stationary light pattern on rear lighting device 112, and to send data/display image to display screen 125. Block 1480 illustrates a return to event loop for the application 200. Block 1450 illustrates that a calculation in Block 1440 determined the user is in motion, and to turn on in-motion light pattern on display screen 125 and rear lighting device 112. Block 1460 illustrates a return to event loop for the application 200.

Figure 15:
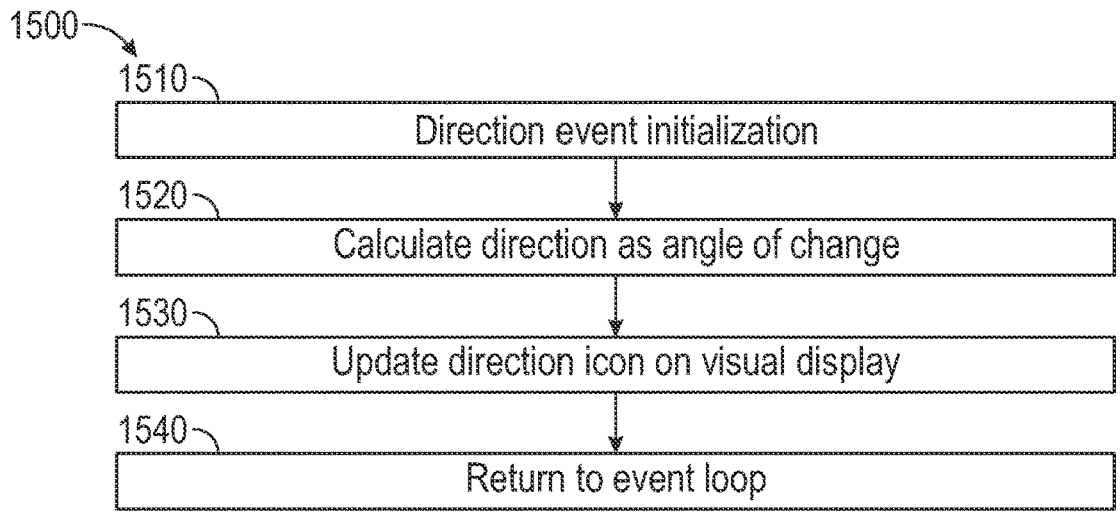
FIG. 15 is a flowchart of a direction event task performance for an application configured for the headset for a mobile device.

FIG. 15 is a flowchart of a direction event task performance 1500 for application 200 of the headset for a mobile device 100. The flowchart illustrated in FIG. 15 relates to a direction event task performance 1500 executed on the application 200 for the headset for mobile device 100 based on events detected by a sensor in the mobile device 103 or initiated by the user. Block 1510 illustrates a direction event initialization step for the application 200. Block 1520 illustrates a calculation of direction as angle of change based on data from the sensor in the mobile device 103 or inputs from the user. Block 1530 illustrates displaying visual direction change notification on the display screen 125. Block 1540 illustrates a return to event loop for the application 200.

The preceding flowcharts are exemplary and non-limiting examples of tasks performed by the application 200. Additional sensor input, user input, environmental input and data obtained and/or generated by the mobile device 103 can produce different and varied tasks by the application 200. Display data and audible text-to-speech responses can be executed based on inputs, events, and/or tasks. The display information on the display screen 125 can be customized to provide more or less information and data as determined to be useful to the user.

Examples of the tasks performed by application 200 include the user triggering the headset for mobile devices 100 to signal for a right turn, after which the application 200 will simultaneously activate the right lighting device 115, display a visual feedback on the display screen 125, and provide an auditory notification, such as a spoken voice emitted by the mobile device 103: "Turning right . . . Turning right." FIG. 11.

Embodiments of the application 200 provide processing of inputs during the operation of the headset for mobile devices 100 and control the visual display and auditory notifications executed by the mobile communication device 103.

In an embodiment, the application 200 is an Android application, which during normal operation can present the speed of the user, the compass direction of travel, and other event status messages, such as right or left turn feedback. The application 200 can further present mapping data, user body medical conditions, including but not limited to heart rate, breathing patterns, blood sugar, temperature, hydration levels, and/or alcohol levels. The assistance of peripheral devices, such as smart watches and other smart wearable devices can assist with real-time medical data for the user. The application 200 can additionally display the currently playing music title, audio book information, and/or other useful information on the display screen. It is understood that some propriety operating systems such as Android, iOS, and others, can require location data be provided to the application 200.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A device, comprising:
   a front assembly comprising:
     a first portion of a housing;
     buckles;
     straps; and
     lighting device connectors;
   a visor frame comprising:
     a second portion of a housing:
     a display screen;
     a mobile device connector; and
     a mobile device comprising a screen, wherein:
       the visor frame is affixed to the front assembly by a housing connecting a first housing portion of the visor frame to a second housing portion of the front assembly;
       the housing secures the mobile device between the front assembly and the visor frame adjacent to the display screen; and
       the display screen is configured to reflect an image from the screen of the mobile device, wherein the mobile device extends laterally between the front assembly and the visor frame and is incline adjustable to enable the image to be reflected, via the display screen. into a top half of a user's field of vision;
   a rear assembly comprising:
     a microcontroller;
     a microcontroller connector; and
     a rear lighting device, wherein the mobile device further comprises a processing device configured to:
       process input signals; and
       send commands to the microcontroller;
   a base assembly comprising;
     buckles; and
     lighting device connectors;
   a left lighting device; and
   a right lighting device, wherein:
     the base assembly and rear assembly are affixed;
     the base assembly is affixed to the front assembly via connection of the straps and the buckles, and connection of the left lighting device and right lighting device with the lighting device connectors; and
     the device is configured to attach to a helmet via adjustment and connection of the straps and the buckles, and adjustment and connection of the left lighting device and right lighting device with the lighting device connectors.

2. The device of claim 1, comprising a wireless controller for use with the device, wherein the wireless controller further comprises control buttons, and wherein the control buttons operate the left lighting device, the right lighting device and the rear lighting device.

3. The device of claim 1, comprising a controller for the device connected via a cable to the device, wherein the controller further comprises control buttons, and wherein the control buttons operate the left lighting device, the right lighting device and the rear lighting device.

4. The device of claim 1, wherein the display screen is a .one-way mirror that occupies a top 50% of the, user's field of vision, and the display screen is configured to receive a mirror image from the mobile device.

5. The device of claim 4, wherein the mirror image from the mobile device is displayed on the mobile device as a laterally inverted image, at maximum brightness, with dark backgrounds, and with bright highlighted text and symbols.

6. The device of claim 1, wherein the mobile device connector and the microcontroller connector are connected by a cable, and the microcontroller, the left. lighting device, the right lighting device, and the rear lighting device are powered by the mobile device.

7. The device of claim 1, further comprising electronic sensors and emitters configured to detect motion and external signals and emit a signal to an external device, wherein the signals are via shortrange electronic wireless transmission.

8. The device of claim 7, wherein the external signals are received from stationary objects selected from the group consisting of traffic signs, traffic lights, street lights, location signs, road reflectors, buildings, stores, and houses.

9. The device of claim 7, wherein the external signals are received from non-stationary objects selected from the group consisting of pedestrians, cars, trucks, motorcycles, bicycles, and smart helmets.

10. The device of claim 1, wherein the first housing portion comprises a screw, and the second housing portion comprises a nut, and wherein the device is configured to secure the mobile device between the front assembly and the visor frame by tightening the screw and the nut.

11. A processing device configured to execute an application on a mobile device, wherein the processing device processes:
   screen controls configured to produce an image on a screen of a mobile device configured to be reflected on a display screen external to the mobile device;
   geolocation data from a mobile device configured to be reflected on a display screen external to the mobile device;
   gyroscopic data from a mobile device configured to be analyzed by the processing device and used to generate safety warning and/or to display information on the screen external to the mobile device;
   wherein: the mobile device is oriented to reflect the screen controls, geolocation data, or gyroscopic data, via the display screen, into a top half of a users field of vision;
   a left turn signal received from a controller and a signal to a left lighting device;
   a right turn signal received from the controller and a signal to a right lighting device;
   a change direction signal received from the controller and a signal to a rear lighting device; and
   a speed change signal received from the controller and a signal to a rear lighting device.

12. The processing device of claim 11, further configured to display the image on the screen of the mobile device laterally inverted at a set brightness level, a set background darkness level, and a set brightness level for highlighted text and symbols, and wherein the processing device is configured to recognize voice commands from a microphone on the mobile device and send voice commands from a speaker on the mobile device.

13. The processing device of claim 11, further configured to send information to the screen of the mobile device comprising:
   music currently playing on the mobile device;
   traffic data received from the mobile device;
   weather data received from the mobile device; and
   phone calls or texts received on the mobile device.

14. The processing device of claim 12, further configured to process voice commands from the user and send signals to a left lighting device, a right lighting device and a rear lighting device, wherein the processing device is configured to turn off the left lighting device, the right lighting device or the rear lighting device after a set period of time or after the processing device detects an action has been performed by the user.

15. The processing device of claim 12, further configured to process information from the mobile device and send audible information to the user via speakers on the mobile device, wherein the audible information comprises:
   music currently playing on the mobile device,
   traffic data received from the mobile device;
   weather data received from the mobile device;
   phone calls received on the mobile device, and
   text messages received on the mobile device via text to speech.

16. A device, comprising:
   a helmet;
   a visor frame comprising a housing, a display screen, a mobile device connector, and a mobile device comprising a screen, wherein:
      the housing secures the mobile device adjacent to the display screen; and
      the display screen is configured to reflect an image from the screen of the mobile device, wherein the mobile device is positioned between the front assembly and the visor frame and is incline adjustable to position the image, reflected via the display screen, within a specific area of a user's field of vision;
   a rear assembly comprising:
      a microcontroller;
      a microcontroller connector; and
      a rear lighting device, wherein the mobile device further comprises a processing device configured to:
         process input signals; and
         send commands to the microcontroller;
   a left lighting device: and
   a right lighting device, wherein the visor frame, rear assembly, the left lighting device, the right lighting device are affixed to the helmet.

17. The device of claim 16, comprising a wireless controller for use with the device, wherein the wireless controller further comprises control buttons, and wherein the control buttons operate the left lighting device, the right lighting device and the rear lighting device, and wherein the mobile device connector and the microcontroller connector are connected by a cable, and the microcontroller, the left lighting device, the right lighting device, and the rear lighting device are powered by the mobile device.

18. The device of claim 16, wherein the display screen is a one-way mirror that occupies a top 25% of the user's field of vision, and the display screen is configured to receive a mirror image from the mobile device, and wherein the mirror image from the mobile device is displayed on the mobile device as a laterally inverted image, at maximum brightness, with dark backgrounds, and with bright highlighted text and symbols.

19. The device of claim 16, further comprising electronic sensors and emitters configured to detect motion and signals and emit a signal, wherein the signals are short range electronic wireless transmissions, and wherein the signals are received from objects selected from the group consisting of pedestrians, cars, bicycles, trucks, traffic signs, traffic lights, street lights, location signs, road reflectors, buildings, stores, and houses.

20. The device of claim 16, further comprising a peripheral device connected to the device, wherein the peripheral device provides:
- medical or health data from the user;
- electronically store music;
- traffic data;
- weather data;
- geolocation data;
- microphones for use with the mobile device; and
- speakers for use with the mobile device.

* * * * *